United States Patent [19]
Kontes

[11] 3,739,948
[45] June 19, 1973

[54] VARIABLE-VOLUME PREDETERMINED-BULK LIQUID DISPENSER

[75] Inventor: James C. Kontes, Vineland, N.J.

[73] Assignee: Kontes Glass Company, Vineland, N.J.

[22] Filed: Sept. 21, 1971

[21] Appl. No.: 182,470

[52] U.S. Cl. ............................................. 222/166
[51] Int. Cl. ............................................. B67d 5/64
[58] Field of Search ............... 222/166, 164, 457, 222/456, 454, 386; 239/DIG. 19, 12, 602, 288.5

[56] References Cited
UNITED STATES PATENTS

| 1,054,705 | 3/1913 | Megirian | 222/457 X |
| 3,543,967 | 12/1970 | O'Connor | 222/386 |
| 2,208,862 | 7/1940 | Stringfellow | 222/457 X |
| 2,524,125 | 10/1950 | Haid | 222/457 X |
| 3,327,904 | 6/1967 | Goda et al. | 222/386 X |
| 3,612,359 | 10/1971 | Sundholm | 222/386 |
| 2,087,139 | 7/1937 | Cameron | 239/288.5 X |
| 2,807,816 | 10/1957 | O'Brien | 239/288.5 X |
| 3,129,894 | 4/1964 | Schermerhorn | 239/602 |
| 1,009,550 | 11/1911 | Moys et al. | 222/457 X |
| 3,576,276 | 4/1971 | Clarke | 222/386 |

Primary Examiner—Samuel F. Coleman
Assistant Examiner—Norman L. Stack, Jr.
Attorney—Spencer B. Michael

[57] ABSTRACT

A variable-volume, predetermined-bulk liquid tilting dispenser, having a precision-bore glass tubing within which a plunger of Teflon is mounted for reciprocation, the plunger being fashioned to withstand repeated autoclaving sterilization operations while maintaining sealing contact with the inner wall of said tubing.

6 Claims, 4 Drawing Figures

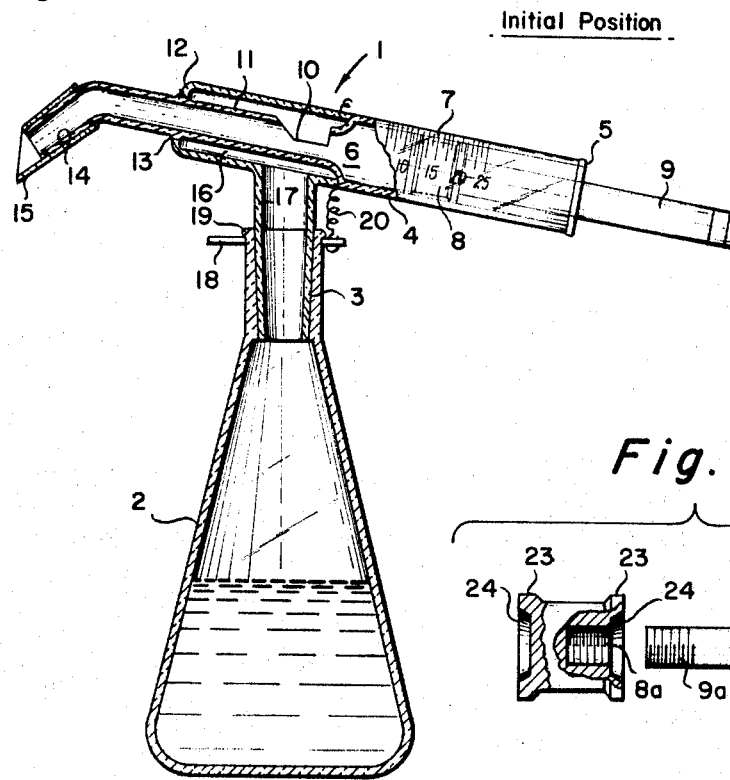
Fig. 1
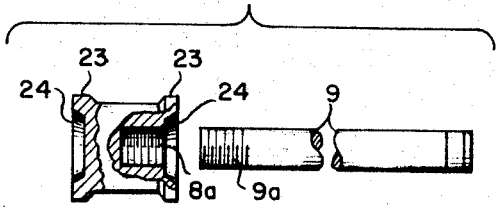
Fig. 4
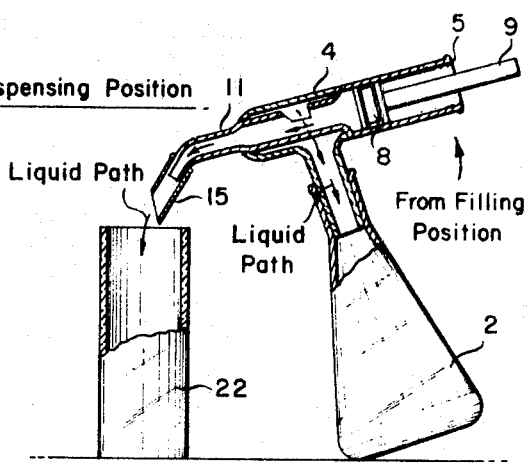
Fig. 3
Fig. 2
INVENTOR.
James C. Kontes
BY
ATTORNEY

VARIABLE-VOLUME PREDETERMINED-BULK LIQUID DISPENSER

This invention relates generally to predetermined bulk liquid dispensers and more particuarly, to dispensers of this type in which the volume of the liquid to be dispensed in a single operation may be varied within predetermined limits.

One object of the invention is to provide a tilting dispenser of the character described wherein a trap chamber embodied in the dispenser is defined by wall members at least one of which is in the form of an adjustable stop or plunger, the position of which within the trap chamber determines the effective volumetric capacity of the chamber.

Another object of the invention is to provide in a dispenser of the character described, readily accessible adjustment means for the plunger within the trap chamber whereby the plunger may be manually positioned therein in accordance with a volumetric scale or calibration inscribed on the wall of the trap chamber.

Another object of the invention is to preclude unauthorized change in the adjustment of the plunger once it has been set, by dismantling the means by which the plunger may be manually adjusted.

A further object of the invention is to provide in a dispenser of the character described a plunger made of plastic material having the properties of Teflon and fashioned so that the outer circumference thereof will accommodate itself to the inner bore of a precision bore cylindrical glass tubing within which it operates, in spite of repeated expansion of said plunger due to successive autoclaving sterilization.

Another object of the invention is to provide a dispenser of the character described with a frangible pouring spout encased within a yieldable protective sleeve to guard the same against breakage.

These and other objects of the invention will become apparent from reading the attached specification in connection with the drawings wherein I have illustrated a preferred form of my invention, and in which:

FIG. 1 is an elevational view of the dispenser in assembled relation to an Erlenmeyer flask with the apparatus shown in normal or dormant position, FIG. 2 is a similar view of the dispenser with the apparatus shown in an inverted trap chamber filling position, FIG. 3 is a similar view of the dispenser showing the apparatus in pouring position, and FIG. 4 is a detail view showing the disabling connection between the plunger and the plunger operating rod, on a slightly enlarged scale.

Referring more particularly to the accompanying drawings, FIG. 1 shows the invention indicated by reference numeral 1, attached to a conventional Erlenmeyer flask 2 by hollow fitment portion 3 fitted into the neck of the flask. The fitment portion 3 forms an integral part of the glass (preferably borosilicate or other autoclavable glass) structure comprising an outer casing or shell portion 4 generally cylindrical in form and open at one end 5 to provide entrance to a variable volume trap chamber 6, the wall of which chamber bears calibration 7 indicating the effective volumetric capacity of the chamber 6 depending upon the position within that chamber of a snug fitting adjustable movable wall member in the form of a stop or plunger 8. The plunger 8 is provided with a removable plunger adjusting rod 9 extending through the open end 5 of the casing and accessible for adjustment of the plunger 8 within the chamber 6, whereby the effective volumetric capacity of the chamber may be varied as will appear. The handle 9 may be detachably connected with the plunger 8 by a screw-threaded connection comprising a threaded terminal portion 9a on the end of the handle 9 and a correspondingly fitted bore or socket 8a formed in the plunger 8, as shown in FIG. 4, by which the handle 9 may be removed after a given setting has been made by the researcher. The detachable connection between the handle 9 and the plunger 8 functions in a sense to enable the researcher to "lock" the plunger in any adjusted position and thus preclude the possibility of some unauthorized personnel changing the set volume of the trap chamber without knowledge of the researcher who has previously determined the volume to be dispensed.

The snug fitting of the plunger within the trap chamber will preclude it being accidentally moved from its set position. The trap chamber 6, fills with liquid from the flask with which it is associated when the flash is inverted, through an opening or wier-defining notch 10 formed in the side wall of the discharge tube or duct 11 which extends through end wall 12 of the shell 4 and to which the tube 11 is sealed as at 13. The end 14 of the discharge tube 11 is bent downwardly and enclosed within a protective plastic sleeve or tube 15, preferably having the properties of Teflon. The tube 15 protects the end of the glass discharge tube from breakage which might otherwise occur during careless handling and operation of the dispenser.

It should be noted that the discharge tube 11 is of lesser diameter than is the outer shell 4, and thus an annular space 16 is provided through which excess liquid flows back into the flask 2 through a laterally-extending tubular portion 17 which at its lower end is externally tapered to form the fitment portion 3. If desired, the flask 2 and the dispensing unit 1 may be releasably secured together by a fork or yoke piece 18 which straddles the neck of the flask below the rolled bead 19, with a tension coil spring 20 having one end permanently connected to one arm of the yoke member 18 passed around the dispenser unit with the other end of the spring 20 detachably connected to the other arm of the yoke member as shown. While I have shown this particular means of securing the unit 1 upon the flask 2 because of its simplicity and security, any other form of securing means may be employed if desired without sacrificing any of the advantages of the dispenser as described.

The unit of the present invention is designed to withstand repeated autoclaving sterilization operations while maintaining proper sealing relation between the plunger and the inner wall of the cylindrical tubing and to this end the tubing is of a precision bore type made by heat shrinking the glass tubing, under vacuum, over a stainless steel mandrel of exact size or dimension according to a known process. The plunger is made of a plastic material having the properties of Teflon, and is provided with one or more circumferential ridges 23 of a dimension to snugly fit the bore of the tube, as shown. The opposite end faces of the plunger are recessed or undercut as shown at 24. This construction provides sufficient flexibility in the end portions of the plunger to enable it to withstand the repeated expansions due to heat of repeated autoclaving sterilization operations and still maintain proper sealing engagement with the tube wall.

In operation, with the unit 1 attached to the flask 2 as shown, and with the plunger 8 adjusted to a position within the trap chamber 6 to define a desired effective volumetric capacity therein, the flask and unit are inverted as shown in FIG. 2. This fills the trap chamber with liquid from the flask and provides a barometric seal as indicated at 21 in FIG. 2. When the flask is returned to the position shown in FIG. 3, excess liquid drains back to the flask and the measured quantity of liquid from the trap chamber discharges through the tube 11 and out the protected spout or tip 15 into a receiving vessel 22 as shown. In view of the foregoing description of the invention, it is apparent that I have provided a tiltable liquid dispensing unit which can be attached to a conventional Erlenmeyer flask or similar vessel, the unit including a trap chamber having an adjustable wall portion in the form of a plunger within the trap chamber whereby the effective volume of said chamber may be varied by variably positioning the plunger within the chamber. The unit includes means for insuring that the set position of the plunger within the trap chamber cannot readily be changed by unauthorized persons by reason of the removable connection between the handle and the plunger. The trap chamber may be filled by inverting the flask to which it is attached and the excess liquid flows back into the flask and the measured quantity of liquid from the trap chamber flows through the discharge spout when the flask and unit are returned to the position shown in FIG. 3. The discharge spout is protected from breakage by a Teflon tip as described.

Having thus described my invention, what I claim is:

1. A tilting predetermined bulk dispenser unit comprising a casing member, means for supporting said casing member in fluid communication with a flask containing a liquid to be dispensed, said support means including a tubular extension having an exterior dimension to fit snugly within the neck of a flask, wall means defining a trap chamber within said casing, means defining duct means having fluid communication with said trap chamber and with said tubular extension and effective to direct liquid from a flask to which said unit may be connected into said trap chamber when the flask is inverted, said duct defining means including discharge means effective when the flask to which the unit is attached is moved to a pouring position after said trap chamber has been thus filled, to discharge liquid from said trap chamber exteriorly of a flask to which said casing may be connected, and means for varying within predetermined liimits the effective volumetric capacity of said trap chamber.

2. The tilting dispenser described in claim 1 wherein said trap chamber defining wall means includes a movable wall member and means operable exteriorly of the casing for moving said wall member within said trap chamber to vary the volumetric capacity of said trap chamber.

3. The dispenser described in claim 2 wherein said movable wall member is carried by a movable plunger fitted for snug engagement with the walls of said trap chamber and handle means detachably connected thereto and operable exteriorly of the casing to move said plunger within the trap chamber to change the volumetric capacity thereof.

4. The tiltable dispenser described in claim 3 wherein said detachable connection between the handle and said plunger includes cooperative screw-threaded features carried by the plunger and the handle and operative from the exterior of the casing to connect and to disconnect the handle and plunger.

5. The dispenser described in claim 3 wherein the walls of the trap chamber are cylindrical, and said plunger is composed of a flexible plastic material having the properties of Teflon and is provided with longitudinally-spaced circumferential ridges, one at each end thereof, said ridges dimensioned to snugly fit the cylindrical wall of the trap chamber; the end portions of said plunger being axially recessed or undercut to provide flexibility in the region of said ridges to accommodate the expansion of the plunger under heat of repeated autoclaving sterilizing operations.

6. A tilting predetermined bulk liquid dispenser unit adapted for attachment to a flask for dispensing measured quantities of liquid contained in said flask, said unit comprising an outer casing member having a laterally directed open-ended tubular extension dimensioned to fit within the neck of a flask, said tubular extension being in fluid communication with the interior of said casing, a trap chamber formed within said casing, a discharge tube in fluid communication with one end of said trap chamber, said casing and discharge tube forming an annular fluid chamber within said casing and surrounding said discharge tube and in fluid communication with said tubular extension, and a wier defining notch in a side wall portion of said discharge tube facing away from said tubular extension, said notch directing fluid into said trap chamber when the flask and attached unit are inverted, and means for variably adjusting the effective volume of said trap chamber.

* * * * *